United States Patent [19]

Swift et al.

[11] 4,447,212
[45] May 8, 1984

[54] VERBAL RESPONSE TIME CONDITIONING APPARATUS

[75] Inventors: John N. Swift, R.D. 3, Box 146, Oswego, N.Y. 13126; Harry M. Hawkins, R.D. 2, Box 61, Oswego, N.Y. 13126

[73] Assignee: J. Nathan Swift, Oswego, N.Y.

[21] Appl. No.: 366,630

[22] Filed: Apr. 8, 1982

[51] Int. Cl.³ .............................................. G09B 21/00
[52] U.S. Cl. .................................... 434/185; 434/335; 434/321
[58] Field of Search ................ 434/335, 185, 319–321; 179/1 SP; 40/455, 456, 457; 46/256, 182, 183; 340/309.15, 309.4; 381/58, 110

[56] References Cited

U.S. PATENT DOCUMENTS 3,667,138  6/1972  Cohen ................................ 434/185

Primary Examiner—Richard C. Pinkham
Assistant Examiner—Leo P. Picard
Attorney, Agent, or Firm—Charles S. McGuire

[57] ABSTRACT

Apparatus for enhancing the educational quality of verbal classroom instruction by conditioning students and teachers to pause for a pre-selected time interval before beginning to speak following the statement of a question or an answer. The apparatus includes a pair of lamps perceptible to both teacher and students operable in response to voice-actuated timing and switching circuitry. A perceptible indication, such as the extinguishment of one lamp and lighting of the other, is provided at the expiration of a selected time interval following completion of a statement, as indicated by the absence of audio signals during the interval. Circuitry is provided for selectively varying both sound level sensitivity and duration of the time interval.

12 Claims, 2 Drawing Figures

VERBAL RESPONSE TIME CONDITIONING APPARATUS

BACKGROUND OF THE INVENTION

The present invention relates to the field of teaching machines and, more specifically, to apparatus designed to condition students and teachers to wait for a selected time interval following completion of a verbal statement, such as questions by the teacher and responses by the students, before a further statement is made.

Educational research at the elementary school level indicates that both teacher and student variables indicative of the efficacy of verbal instruction are improved by training the teacher and students to wait for a few seconds before either begins a new question or answer following completion of a question or answer by the other. Such research is documented, e.g., in "Wait-Time And Rewards As Instructional Variables, Their Influence On Language, Logic And Fate Control: Part One, Wait-Time" by Mary Budd Rowe, *Journal of Research in Science Teaching*, Vol. 11, No. 2, pp. 81–94 (1974). According to this research, the mean wait-time from completion of a question by the teacher until a response was commenced by a student or a further statement made by the teacher (rephrasing, repeating, or asking a new question, calling on another student, etc.) to be on the order of one second in the absence of any training, conditioning or other instruction regarding wait-time. The teacher normally reacts or asks another question in an average time of 0.9 seconds after completion of a response by a student.

Through proper training the teacher and students may be conditioned to extend the wait-time between questions and answers. It was found that when mean wait-times of 3 to 5 seconds are achieved, the following effects, among others, are noted: the length of response increases, the number of unsolicited but appropriate responses increases, failures to respond decrease, incidence of speculative responses increases, etc. In addition to such improvement in student variables, similar improvements in teacher variables were noted.

While research such as that outlined above has demonstrated the advantages accruing from wait-time conditioning, there remains the problem of instituting suitable training programs for carrying this into effect. A high degree of cooperation and concentration are required from both teachers and students in breaking the normal, relatively short wait-time patterns when depending simply upon advising the individuals to observe the longer wait-times.

Accordingly, it is a principal object of the present invention to provide a device which will effectively aid in conditioning teachers and students to observe longer than normal wait-times in verbal exchanges during classroom instruction.

Another object is to provide a device which enhances the quality of verbal, question-and-answer classroom instruction by means of unobtrusive, non-disruptive, visual indicating means actuable in response to voice signals from the teacher and students.

A further object is to provide inexpensive, portable apparatus for classroom use to improve the content of verbal instruction by aiding in establishing a more efficacious wait-time between teacher and student statements.

Other objects will in part be obvious and will in part appear hereinafter.

SUMMARY OF THE INVENTION

The foregoing objects are effectively realized through use of the device of the invention, which incorporates switching and timing circuitry responsive to audio signals produced by normal speech of the teacher and students. A pair of lamp bulbs, preferably of different colors such as green and red, are associated with the device and positioned within the classroom so as to be visible to both teacher and students during the instruction. A first bulb, e.g., the red, is turned on and the opposite or green bulb is off in response to electrical signals generated in response to audio input. That is, any time the teacher or a student is speaking, the resulting audio signals are utilized to actuate the red and deactuate the green bulb.

When the signals produced by audio input stop, i.e., when no one is speaking, timing circuitry is operative to produce a signal at the end of a desired time interval which actuates the green bulb and deactuates the red. Thus, the red bulb remains on whenever someone is speaking and for a certain time thereafter. Upon expiration of the time interval with no audio signals produced, the circuitry serves to switch automatically the actuation and deactuation of the two lamps. The green lamp turning on provides a visual indication that the desired wait-time has elapsed and verbalizing may be resumed.

Circuit means are provided to allow selective adjustment of the sound level to which the device is responsive, and the length of the time interval between the end of audio signals and the switching of the indicating means. The entire device may be conveniently housed in a briefcase, or the like, for ease of portability.

DETAILED DESCRIPTION

Figure 1:
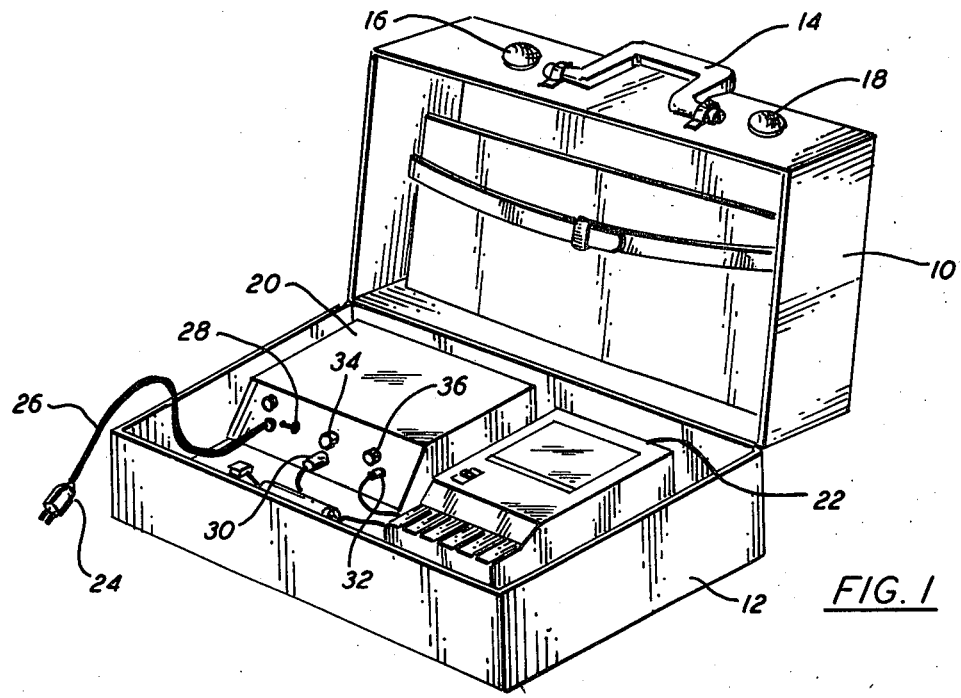
FIG. 1 is a perspective view of one of the many physical embodiments in which the device of the invention may be constructed.

Referring now to the drawing, elements of the invention are housed in a carrying case having hingedly attached top 10 and bottom 12 sections. Fixedly positioned on top section 10, on either side of carrying handle 14, are red 16 and green 18 lamp bulbs. These are connected by suitable electrical leads (not shown) to circuit elements within timing-switching unit 20 which, together with cassette tape recorder 22, is housed within the carrying case.

The circuit elements are connected to a 120 volt AC outlet by plug 24 and cord 26. A control panel on unit 20 includes on/off switch 28, an outlet for receiving plug 30 to provide 120 volt AC power to recorder 22, audio input jack 32, sensitivity control knob 34 and time interval control knob 36. Recorder 22 is conventional in all respects, having a suitable built-in or remote microphone (not shown) for audio pick-up.

Figure 2:
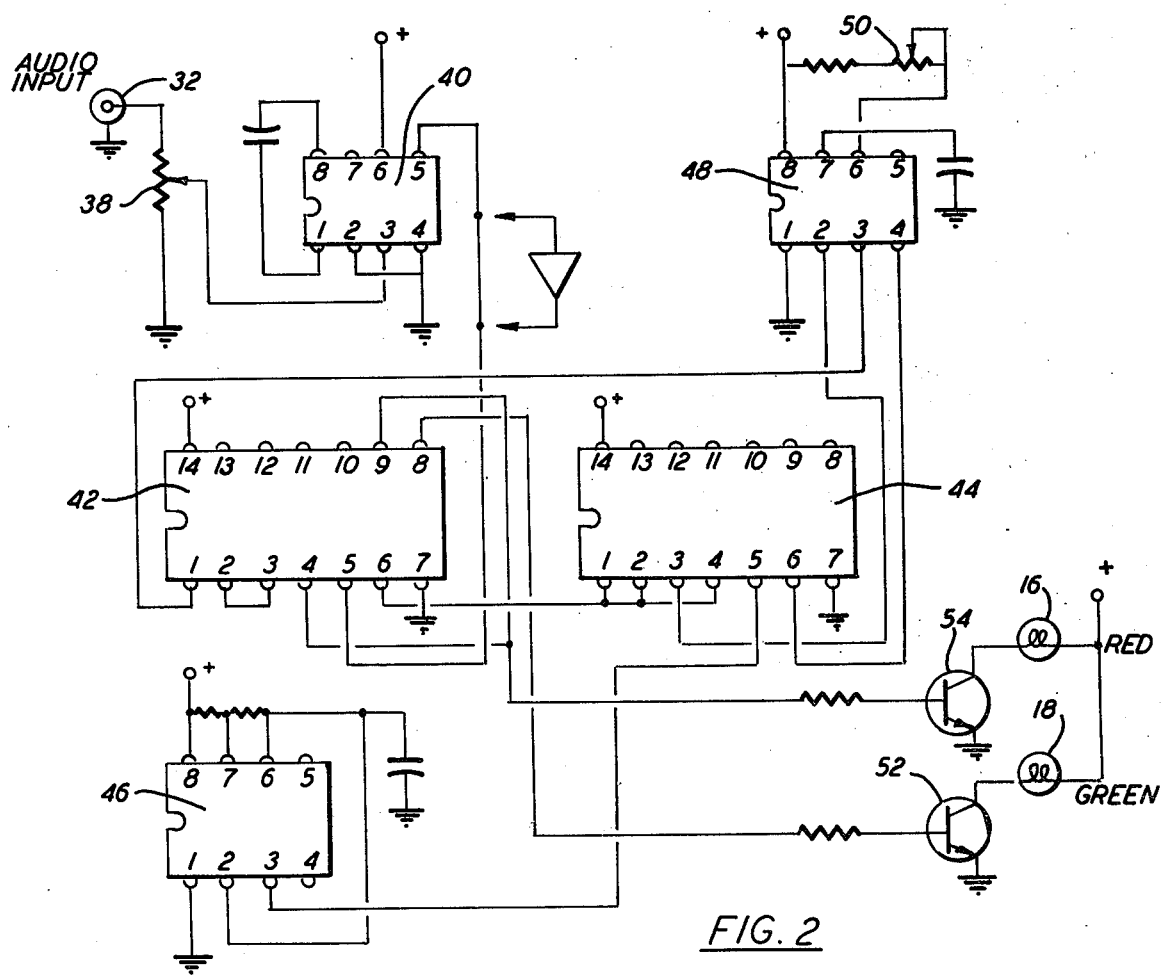
FIG. 2 is an electrical schematic of the circuitry by which the invention is carried into effect.

Turning now to FIG. 2, operation of the circuitry of unit 20 will be explained. Electrical signals produced within recorder 22 in response to audible sounds received thereby are applied to the unit 20 circuitry via audio input jack 32. Sensitivity adjustment knob 34 is connected to potentiometer 38 which provides adjustment of the audio signal level to match classroom acoustics and audio characteristics. The adjusted audio signals are amplified with an integrated circuit preamplifier 40, such as a model RS 386, and passed through a Schmitt trigger circuit 42 which provides pulses having a square wave characteristic. The integrated circuit chip used in the circuit of FIG. 2 to provide the trigger function is a model 7414, having six Schmitt triggers (inverting) which may be used independently.

The switching function is provided in the illustrated circuit embodiment by a model 7400 quad 2-input NAND gate integrated circuit chip 44. In this chip configuration, all four positive-logic NAND gates may be used independently. On any one gate, when either input is low the output is high; when both inputs are high the output is low. Two of the gates are utilized in performing the switching function for the present invention.

The output of trigger circuit 42, which is present whenever audio signals above the selected thresh-hold level are received, is applied as a first input to one of the gates of chip 44, on pin 4 thereof. The other input to this gate is applied at pin 5 of chip 44 from the output (pin 3) of an astable oscillator 46, a suitable form of which is a Signetics model NE SE 555 monolithic timing circuit, a highly stable controller capable of producing accurate time delays or oscillation. With a 5 volt (DC) power supply, oscillator 46 produces a square wave pulse train of approximately 1,000 Hz. The pulse train is allowed to pass to the gate output at pin 6 of chip 44 only when audio pulses are received at input pin 4.

The 1,000 Hz signal from pin 6 of chip 44 is applied to the reset control (pin 4) of a monostable switching circuit 48 which may conveniently be provided in the form of a second model NE SE 555 timing circuit. Time interval control knob 36 on unit 20 is connected to potentiometer 50 which allows adjustment of the time delay of switch 48 within a desired range, e.g., one to four seconds.

The output of trigger circuit 42 is also applied as dual inputs to a second NAND gate, on pins 1 and 2 of chip 44, the signal thereby being inverted and passed from pin 3 of chip 44 to pin 2, the trigger control of monostable switch 48. When the inverse of the audio signals (indicating an absence of audio input) are thus applied to the trigger control of switch 48, it begins to time by switching its output to positive. If further audio input is received during the pre-selected time interval, the inverted signal received at the trigger control of switch 48 will allow the 1,000 Hz signal to pass to reset pin 4 of monostable circuit 48. In effect, this action resets circuit 48 and the timing action does not begin again until a further signal indicating an absence of audio input, is received at trigger input pin 2 of switch 48.

If no reset signal is received before expiration of the pre-selected time interval, the positive signal at output pin 3 of switch 48 will return to an "off" or negative condition, this output being applied to input pin 1 of chip 42. The resulting action of the Schmitt trigger circuits produces mutually reversed outputs at pins 8 and 9 which are respectively applied to driver transistors 52 and 54.

Thus, at all times when the device is operative a signal is applied to either transistor 52, thereby providing a ground connection to illuminate green bulb 18, or transistor 54, which serves to illuminate red bulb 16. Through the action of the circuitry described above, when audio input signals are present at terminal 32 and during the pre-selected time interval established by circuit 48 following the absence of audio input, red lamp 16 will be on and green lamp 18 off. When no audio signals are produced, i.e., when there is no speech in the classroom where the device is employed, for a time equal to the pre-set delay of circuit 48, green lamp 18 goes on and red lamp 16 goes off.

A suitable power supply circuit (not shown) is provided in conventional fashion for converting normal house current at 110–115 v AC to 5 v DC which is applied at all terminal marked with a + sign in the circuit of FIG. 2. Other conventional circuit elements such as fuses, band pass filter 55, resistors, capacitors, etc., are provided as required.

The device is utilized by being placed in a classroom where the lamps are visible to both teacher and students. The class is instructed that no one is allowed to speak except the teacher or student who is speaking while the red lamp is on until the red lamp goes off and the green lamp comes on. The device has proven effective in improving the educational variables enumerated earlier herein virtually from the inception of its classroom use. Thus, the desired wait-time conditioning is provided in a relatively inexpensive, unobtrusive and easily portable device, without a much longer and more distracting or disruptive training period which would otherwise be required in order to achieve the desired wait times.

What is claimed is:

1. A conditioning device for use in a classroom wherein verbal statements, questions and responses are exchanged between teacher and students, said device comprising:
    (a) a single audio input means for receiving verbalized sounds from said teacher and students at or above a predetermined sound level and operable to generate a first electrical signal in response thereto;
    (b) first and second electric lamps positioned for observation by all of said teacher and students;
    (c) power supply means operable to illuminate said first and second lamps when connected thereto;
    (d) timing means operable to generate a second electrical signal in response to the absence of said first signal for a predetermined time period; and
    (e) switching means operable to connect power supply means only to said first lamp in response to said first signal and only to said second lamp in response to said second signal, whereby said first lamp is illuminated and said second lamp extinguished in response to said verbalized sounds, and said first lamp is extinguished and said second lamp is illuminated in response to the absence of said verbalized sounds for said predetermined time period, thereby conditioning said teacher and students to wait for said predetermined time period after cessation of said verbalized sounds before resuming further classroom verbalization.

2. The invention according to claim 1 wherein said first lamp is red and said second lamp is green.

3. The invention according to claim 1 wherein said switching means comprises an integrated circuit gate means.

4. The invention according to claim 3 wherein said gate means comprises a plurality of NAND gates.

5. The invention according to claim 1 wherein said timing means comprises means for generating a pulse train.

6. The invention according to claim 5 wherein said pulse train generating means comprises an astable oscillator.

7. The invention according to claim 6 wherein said switching means comprises an integrated circuit gate means and the output of said oscillator is applied as an input to said gate means.

8. The invention according to claim 7 and further including a trigger circuit having an output applied in response to said first signal as a second input to said gate means to cause pulses from said oscillator to pass through said gate means as a gate output signal.

9. The invention according to claim 8 and further including a monostable switching circuit having a reset input connected to said gate output signal.

10. The invention according to claim 9 wherein said gate means comprises a first NAND gate.

11. The invention according to claim 10 and further including a second NAND gate, both inputs of which are coupled to said trigger circuit and the output of which is coupled to the trigger control of said monostable switching circuit to produce first and second output signals in response to inputs from said first and second NAND gates, respectively.

12. The invention according to claim 11 wherein the output of said monostable switching circuit is coupled to an input of said trigger circuit to produce an output on a first line connected to said first lamp to cause illumination thereof in response to said first output signal from said monostable switching circuit and to terminate said output on said first line and to produce an output on a second line connected to said second lamp to cause illumination thereof in response to said second output signal from said monostable switching circuit.

* * * * *